US012795235B2

(12) United States Patent
Sampei et al.

(10) Patent No.: US 12,795,235 B2
(45) Date of Patent: Nov. 10, 2026

(54) ELECTRONIC DEVICE FOR ASSISTING DETERMINATION OF AUTO-FOCUS POSITION, CONTROL METHOD THEREOF, AND NON-TRANSITORY COMPUTER READABLE MEDIUM

(71) Applicant: CANON KABUSHIKI KAISHA, Tokyo (JP)

(72) Inventors: Takahiro Sampei, Tokyo (JP); Takashi Mizuno, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 39 days.

(21) Appl. No.: 18/960,533

(22) Filed: Nov. 26, 2024

(65) Prior Publication Data

US 2025/0193519 A1 Jun. 12, 2025

(30) Foreign Application Priority Data

Dec. 11, 2023 (JP) ................................ 2023-208780

(51) Int. Cl.
*H04N 23/67* (2023.01)
*H04N 23/63* (2023.01)

(52) U.S. Cl.
CPC ......... *H04N 23/675* (2023.01); *H04N 23/632* (2023.01); *H04N 23/635* (2023.01)

(58) Field of Classification Search
CPC .... H04N 23/635; H04N 23/675; H04N 23/67; H04N 23/667; H04N 23/631; H04N 23/633; H04N 23/632
See application file for complete search history.

(56) References Cited

U.S. PATENT DOCUMENTS

2009/0244357 A1* 10/2009 Huang ................ H04N 23/635 348/E5.024
2016/0165142 A1* 6/2016 Hada ...................... H04N 23/62 348/211.1
2016/0309089 A1* 10/2016 Hongu ................... H04N 23/61
2018/0063396 A1* 3/2018 Kondo ................... H04N 23/58
2020/0036900 A1* 1/2020 Masamura ................ G06T 5/50
2023/0097922 A1* 3/2023 Asawa ................... H04N 23/62 348/333.01

FOREIGN PATENT DOCUMENTS

JP 2019012900 A 1/2019
JP 2023017312 A 2/2023

* cited by examiner

*Primary Examiner* — Kelly L Jerabek
(74) *Attorney, Agent, or Firm* — Cowan, Liebowitz & Latman, P.C.

(57) ABSTRACT

An electronic device acquires a live-view image obtained by an imaging device picking up an image of a real space. The electronic device determines a first range indicating a range having accuracy of auto-focus equal to or higher than predetermined accuracy in the live-view image. The electronic device controls a display so that a part of the live-view image is displayed on a basis of the first range.

13 Claims, 9 Drawing Sheets

ELECTRONIC DEVICE FOR ASSISTING DETERMINATION OF AUTO-FOCUS POSITION, CONTROL METHOD THEREOF, AND NON-TRANSITORY COMPUTER READABLE MEDIUM

BACKGROUND OF THE DISCLOSURE

Field of the Disclosure

The present invention relates to an electronic device, a control method thereof, and a non-transitory computer readable medium.

Description of the Related Art

In a digital camera, at focusing by auto-focus (AF), a function is known, which displays an AF frame, i.e., a display item indicating a focusing position on a live-view image (Japanese Patent Application Publication No. 2019-12900).

A user can recognize a subject focused on the live-view image by display of the AF frame. And if the subject intended by the user is not focused, the user can perform re-focusing by changing a position of the AF frame by an operation.

SUMMARY OF THE DISCLOSURE

There may be a case in which a limitation is caused by a camera or a lens in a range in which an AF position can be specified (hereinafter, referred to as an "AF available range"). In this case, it is difficult for a photographer to visually recognize the AF available range and to specify the position of the AF (focusing position) in the AF available range.

The present invention has an object to facilitate, even if there is a limitation on a range in which an AF position can be specified, determination of the AF position in the range by a user.

An aspect of the present disclosure is an electronic device including: a processor; and a memory storing a program which, in a case where being executed by the processor, causes the electronic device to execute image acquiring processing of acquiring a live-view image which picked up an image of a real space by an imaging device; execute determination processing of determining a first range indicating a range having accuracy of auto-focus equal to or higher than predetermined accuracy in the live-view image; and execute control processing of controlling a display such that a part of the live-view image is displayed on a basis of the first range.

An aspect of the present disclosure is a control method of an electronic device, the method comprising: an image acquisition step of acquiring a live-view image which picked up an image of a real space by an imaging device; a determination step of determining a first range indicating a range having accuracy of auto-focus equal to or higher than predetermined accuracy in the live-view image; and a control step of controlling a display such that a part of the live-view image is displayed on a basis of the first range.

Further features of the present disclosure will become apparent from the following description of exemplary embodiments with reference to the attached drawings.

DESCRIPTION OF THE EMBODIMENTS

Embodiment 1

In Embodiment 1, in a camera 100 (imaging device), which is an electronic device to which a single lens can be attached, an example of enlarged display of an AF available range (area capable of positioning AF distance), which is a range in which an AF position can be specified will be explained.

Figure 1A:
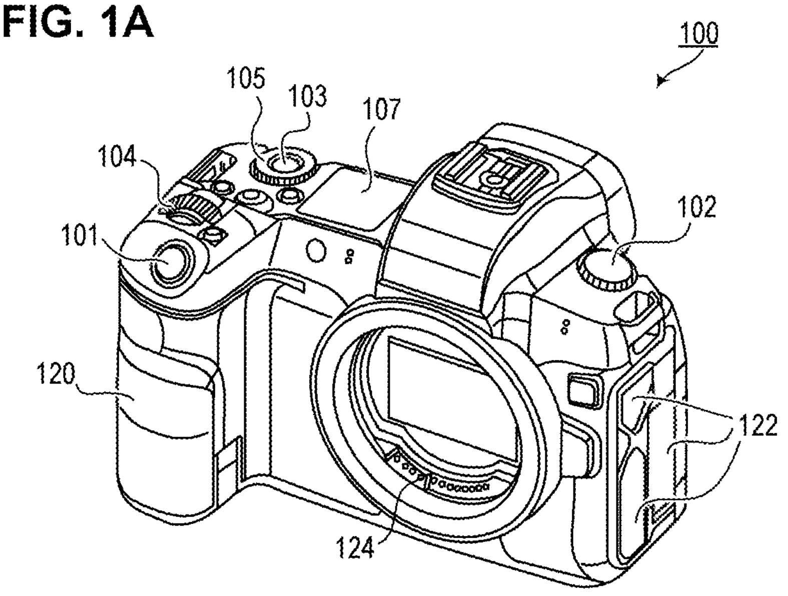
FIGS. 1A and 1B are appearance views of a camera according to an Embodiment 1.
Figure 1B:
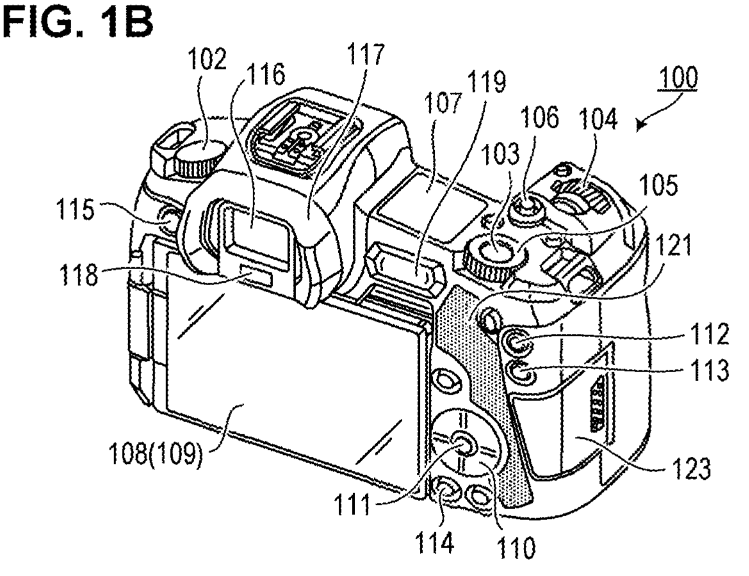

FIGS. 1A and 1B are appearance views illustrating an example of an appearance of a camera 100. FIG. 1A is a perspective view when the camera 100 is viewed from a front surface side. FIG. 1B is a perspective view when the camera 100 is viewed from a rear surface side.

The camera 100 has, on an upper surface, a shutter button 101, a power switch 102, a mode-switching switch 103, a main electronic-dial 104, a sub electronic-dial 105, a video button 106, and an out-of-finder display unit 107. The shutter button 101 is an operation member for giving a photographing-preparation instruction or a photographing instruction. The power switch 102 is an operation member for switching between on and off of the power supply of the camera 100. The mode-switching switch 103 is an operation member for switching among various modes. The main electronic-dial 104 is a rotary operation member for changing a set value of a shutter speed, a diaphragm and the like. The sub electronic-dial 105 is a rotary operation member for moving a selection frame (cursor) and image feeding. The video button 106 is an operation member for giving instructions for start and stop of video photographing (recording). The out-of-finder display unit 107 displays various set values of the shutter speed, the diaphragm and the like.

The camera 100 has a display unit 108, a touch panel 109, a direction key 110, a SET button 111, an AE-lock button 112, an enlargement button 113, a replay button 114, a menu button 115, an eyepiece unit 116, an eyepiece-detection unit 118, and a touch bar 119. The display unit 108 displays images and various types of information. The touch panel 109 is an operation member for detecting a touch operation to a display surface (touch operation surface) of the display unit 108. The direction key 110 is an operation unit constituted by a key (four-direction key) that can be pressed down in upper, lower, left and right directions, respectively. Processing according to the pressed-down position of the direction key 110 can be executed. The SET button 111 is an operation member pressed down mainly when a selection item is to be determined. The AE-lock button 112 is an operation member pressed down when an exposure state is fixed in a photographing-standby state. The enlargement button 113 is an operation member for switching between on and off of an enlargement mode in the live-view display (LV display) of the photographing mode. When the enlargement mode is on, by operating the main electronic-dial 104, the live-view image (LV image) is enlarged or contracted. In addition, the enlargement button 113 is used when a replayed image is enlarged in the replay mode or when an enlargement rate is to be increased. The replay button 114 is an operation member for switching between the photographing mode and the replay mode. By pressing down the replay button 114 in the photographing mode, the mode transfers to the replay mode, and a latest image in the images recorded in a recording medium 227, which will be described later, can be displayed on the display unit 108.

The menu button 115 is an operation member pressed down for displaying a menu screen capable of various settings on the display unit 108. The user can intuitively make various settings by using the menu screen displayed on the display unit 108, the direction key 110, and the SET button 111. The eyepiece unit 116 is a part for positioning the eye on an eyepiece finder (looking-into type finder) 117 for looking into. The user can visually recognize a video displayed on an EVF 217 (Electronic View Finder), which will be described later, inside the camera 100 via the eyepiece unit 116. The eyepiece-detection unit 118 is a sensor for detecting whether or not the user is positioning the eye on the eyepiece unit 116 (eyepiece finder 117).

The touch bar 119 is a line-shaped touch-operation member (line-touch sensor) capable of receiving a touch operation. The touch bar 119 is disposed at such a position capable of a touch operation (touchable) by the thumb of the right hand in a state where a grip unit 120 is gripped by the right hand (state gripped by the little finger, the third finger, and the middle finger of the right hand) so that the shutter button 101 can be pressed down by the forefinger of the right hand. That is, the touch bar 119 is operable in such a holding state (photographing attitude) that the shutter button 101 can be pressed down any time by positioning the eye at the eyepiece finder 117 and by looking into the eyepiece unit 116. The touch bar 119 can receive a tapping operation (operation of touching and separating without moving the touch position within a predetermined period), a sliding operation to right and left (operation of touching and then, moving the touch position while touching) and the like, which are performed on the touch bar 119. The touch bar 119 is an operation member different from the touch panel 109 and does not include the display function. The touch bar 119 functions as a multi-function bar (M-Fn bar) that can assign various functions, for example.

In addition, the camera 100 has the grip unit 120, a thumb-rest unit 121, a terminal cover 122, a lid 123, a communication terminal 124 and the like. The grip unit 120 is a holding unit formed in such a shape that the user can easily grip by the right hand when the user holds the camera 100. The shutter button 101 and the main electronic-dial 104 are disposed at such a position that can be operated by the forefinger of the right hand in a state where the camera 100 is held by gripping the grip unit 120 by the little finger, the third finger, and the middle finger of the right hand. In addition, in the similar state, the sub electronic-dial 105 and the touch bar 119 are disposed at a position operable by the thumb of the right hand. The thumb-rest unit 121 (thumb-standby position) is a grip unit provided on a rear surface side of the camera 100 at such a spot that the thumb of the right hand gripping the grip unit 120 in a state where none of the operation members is operated can be placed. The thumb-rest unit 121 is constituted by a rubber member for improving a holding force (grip feeling). The terminal cover 122 protects a connector such as a connection cable for connecting the camera 100 to external equipment (external device). The lid 123 protects the recording medium 227 and a slot by blocking the slot for storing the recording medium 227, which will be described later. The communication terminal 124 is a terminal for performing communication with a lens unit (a lens unit 200, which will be described later, and a twin-lens unit 600 and the like) side, which is detachably attached to the camera 100.

Figure 2:
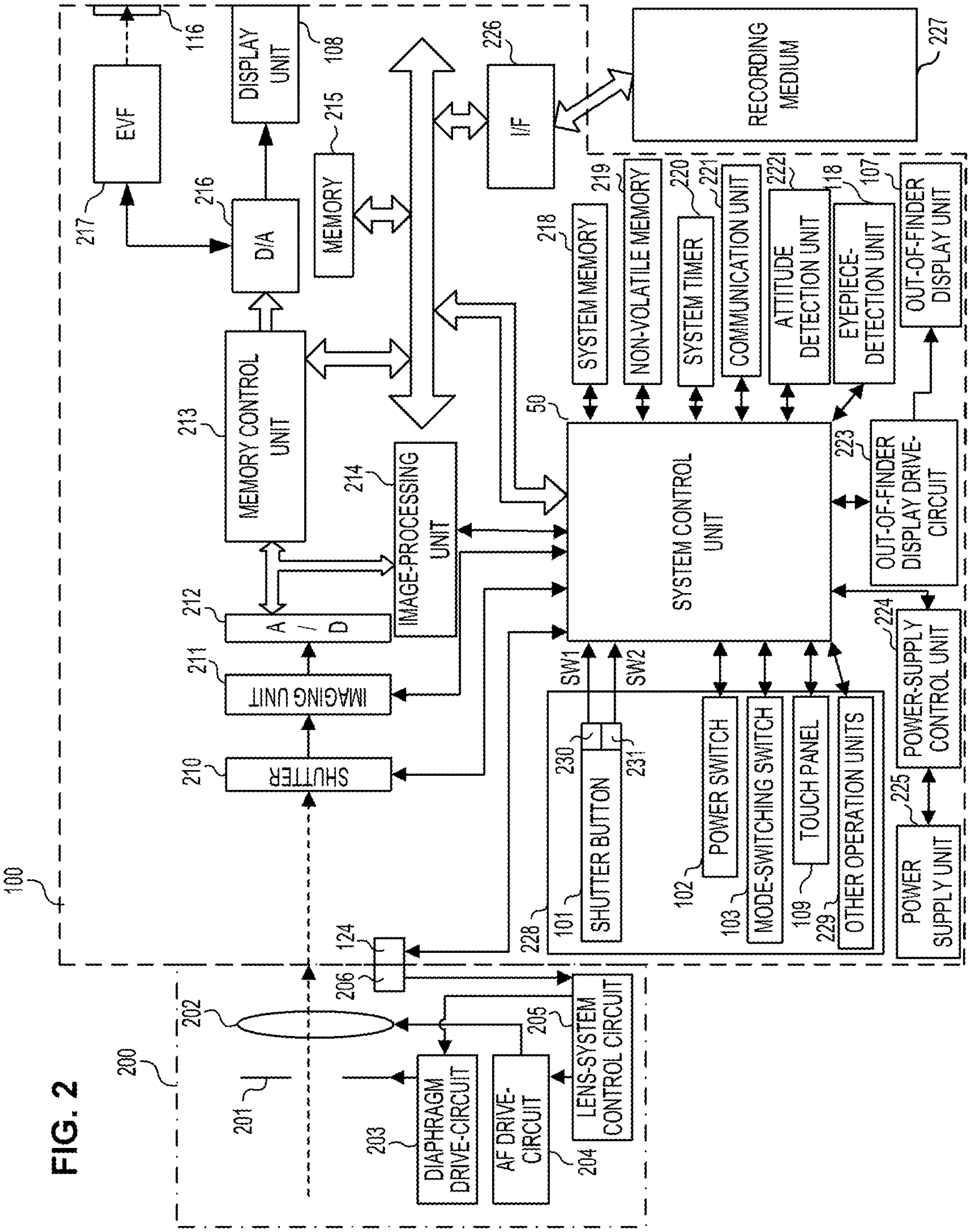
FIG. 2 is a configuration diagram of the camera according to the Embodiment 1.

FIG. 2 is a block diagram illustrating an example of a configuration of the camera 100. Note that, in FIG. 2, the same constituent elements as those in FIGS. 1A and 1B are given the same signs as those in FIGS. 1A and 1B, and explanation of the constituent elements are omitted as appropriate. In FIG. 2, the lens unit 200 is attached to the camera 100.

First, the lens unit 200 will be explained. The lens unit 200 is one type of a replacement lens unit that can be detachably attached to the camera 100. The lens unit 200 is a single-lens unit and is an example of a usual lens unit. The lens unit 200 has a diaphragm 201, a lens 202, a diaphragm drive-circuit 203, an AF drive-circuit 204, a lens-system control circuit 205, a communication terminal 206, and the like.

The diaphragm 201 is constituted such that an aperture diameter is adjustable. The lens 202 is constituted by a plurality of lenses. The diaphragm drive-circuit 203 adjusts a light amount by controlling an aperture diameter of the diaphragm 201. The AF drive-circuit 204 performs focusing by driving the lens 202. The lens-system control circuit 205 controls the diaphragm drive-circuit 203, the AF drive-circuit 204 and the like on the basis of an instruction of a system control unit 50, which will be described later. The lens-system control circuit 205 executes control of the diaphragm 201 via the diaphragm drive-circuit 203 and performs focusing by changing the position of the lens 202 via the AF drive-circuit 204. The lens-system control circuit 205 can communicate with the camera 100. Specifically, the communication is performed via the communication terminal 206 of the lens unit 200 and the communication terminal 124 of the camera 100. The communication terminal 206 is a terminal for the lens unit 200 to perform communication with the camera 100 side.

Subsequently, the camera 100 will be explained. The camera 100 has a shutter 210, an imaging unit 211, an A/D converter 212, a memory control unit 213, an image processing unit 214, a memory 215, a D/A converter 216, the EVF 217, the display unit 108, and the system control unit 50.

The shutter 210 is a focal-plane shutter which can freely control exposure time of the imaging unit 211 on the basis of the instruction of the system control unit 50. The imaging unit 211 is an imaging element (image sensor) constituted by an element (CCD, CMOS element and the like) which converts an optical image to an electric signal. The imaging unit 211 is an image acquiring unit which acquires a picked-up image which picked up an image of a real space. The imaging unit 211 may have an imaging-surface phase-difference sensor which outputs defocus amount information to the system control unit 50. The A/D converter 212 converts an analog signal output from the imaging unit 211 to a digital signal. The image processing unit 214 executes predetermined processing (pixel interpolation, resizing processing such as contraction, color-conversion processing and the like) to the data from the A/D converter 212 or data from the memory control unit 213. In addition, the image processing unit 214 executes predetermined arithmetic processing by using picked-up image data. On the basis of the acquired arithmetic result, the system control unit 50 executes exposure control and distance measurement control. By means of this processing, AF processing of the TTL (Through The Lens) method, AE (Automatic Exposure) processing, EF (flash pre-light emission) processing and the like are executed. Moreover, the image processing unit 214 executes predetermined arithmetic processing by using the picked-up image data. On the basis of the acquired arithmetic result, the system control unit 50 executes AWB (Auto White Balance) processing of the TTL method.

The image data from the A/D converter 212 is written in the memory 215 via the image processing unit 214 and the memory control unit 213. Alternatively, the image data from the A/D converter 212 is written in the memory 215 via the memory control unit 213, not via the image processing unit 214. The memory 215 stores the image data acquired by the imaging unit 211 and converted by the A/D converter 212 to the digital data. In addition, the memory 215 stores the image data for display on the display unit 108 or the EVF 217. The memory 215 includes a sufficient storage capacity for storing predetermined numbers of still images and moving images and sound for a predetermined time. In addition, the memory 215 simultaneously serves as a memory (video memory) for image display.

The D/A converter 216 converts the image data for display stored in the memory 215 to an analog signal and supplies it to the display unit 108 or the EVF 217. Therefore, the image data for display written in the memory 215 is displayed on the display unit 108 or the EVF 217 via the D/A converter 216. The display unit 108 or the EVF 217 performs display according to the analog signal from the D/A converter 216. The display unit 108 and the EVF 217 are displays such as an LCD and an organic EL, for example. The digital signal A/D converted by the A/D converter 212 and accumulated in the memory 215 is converted to an analog signal in the D/A converter 216. The analog signal is sequentially transferred to the display unit 108 or the EVF 217 and displayed as an image. As a result, live-view display is performed.

The system control unit 50 is a control unit constituted by at least one processor and/or at least one circuit. That is, the system control unit 50 may be a processor, may be a circuit or may be a combination of a processor and a circuit. The system control unit 50 controls the entire camera 100. The system control unit 50 realizes each processing of the flowchart, which will be described later, by executing the program recorded in a non-volatile memory 219. In addition, the system control unit 50 also executes display control by controlling the memory 215, the D/A converter 216, the display unit 108, the EVF 217 and the like.

In addition, the camera 100 has a system memory 218, the non-volatile memory 219, a system timer 220, a communication unit 221, an attitude detection unit 222, and an eyepiece-detection unit 118.

For the system memory 218, a RAM, for example, is used. In the system memory 218, a constant, a variable for operation of the system control unit 50, a program read out of the non-volatile memory 219 and the like are expanded.

The non-volatile memory 219 is a memory which can be electrically erased/recorded. For the non-volatile memory 219, EEPROM, for example, is used. In the non-volatile memory 219, a constant, a program and the like for operation of the system control unit 50 are recorded. The program referred to here is a program for executing the flowchart, which will be described later. The system timer 220 is a clock unit which measures time used for various controls and time of an incorporated clock.

The communication unit 221 transmits/receives a video signal and a sound signal with an external device connected wirelessly or by a wired cable. The communication unit 221 can be also connected to the wireless LAN (Local Area Network) and the Internet. Moreover, the communication unit 221 is capable of communication with the external device also via Bluetooth (registered trademark) and Bluetooth Low Energy. The communication unit 221 can transmit images (including live images) picked up by the imaging unit 211 and images recorded in the recording medium 227 and can receive images and other various types of information from the external device.

The attitude detection unit 222 detects an attitude of the camera 100 with respect to the gravity direction. It is possible to distinguish whether the image photographed by the imaging unit 211 is an image photographed by holding the camera 100 laterally or an image photographed by holding it vertically on the basis of the attitude detected by the attitude detection unit 222. The system control unit 50 can add direction information according to the attitude detected by the attitude detection unit 222 to an image file of the image photographed by the imaging unit 211 or rotate the image in accordance with the detected attitude. For the attitude detection unit 222, an acceleration sensor, a gyro sensor and the like, for example, can be used. By using the attitude detection unit 222, a motion of the camera 100 (panning, tilting, lifting-up, still or not and the like) can be also detected.

The eyepiece-detection unit 118 can detect approach of an object to the eyepiece unit 116 (eyepiece finder 117). For the eyepiece-detection unit 118, an infrared proximity sensor can be used, for example. When an object approaches, an infrared ray emitted from a light-projection unit of the eyepiece-detection unit 118 is reflected by the object and is received by a light receiving unit of the infrared proximity sensor. A distance from the eyepiece unit 116 to the object can be distinguished by an amount of the received infrared ray. As described above, the eyepiece-detection unit 118 performs eyepiece detection for detecting a proximity distance of the object to the eyepiece unit 116. The eyepiece-detection unit 118 is an eyepiece detection sensor which detects approach (approach to the eye) and separation (separation from the eye) of an eye (object) to the eyepiece unit 116. When an object approaching from the non-approach-to-eye state (non-approach state) to within a predetermined distance with respect to the eyepiece unit 116 is detected, it is detected as the approach to the eye. On the other hand, when the object whose approach was detected is separated from the approach-to-eye state (approach state) for a predetermined distance or more, it is detected as the separation from the eye. A threshold value for detecting the approach to the eye and a threshold value for detecting the separation from the eye may be different by providing hysteresis, for example. In addition, after the approach-to-eye is detected, it is assumed to remain in the approach-to-eye state until the separation from the eye is detected. After the separation from the eye is detected, it is assumed to remain the non-approach-to-eye state until the approach to the eye is detected. The system control unit 50 switches display (display state)/non-display (non-display state) of the display unit 108 and the EVF 217 in accordance with the state detected by the eyepiece-detection unit 118. Specifically, at least in a photographing-standby state and when the switching setting of the display destination is automatic switching, the display destination is set to the display unit 108, the display is turned on, and the EVF 217 is set to non-display during separation from the eye. In addition, during the approach to the eye, the display destination is set to the EVF 217, the display is turned on, and the display unit 108 is set to non-display. Note that, the eyepiece-detection unit 118 is not limited to the infrared proximity sensor, but for the eyepiece-detection unit 118, other sensors may be used as long as a state that can be considered to be the approach-to-eye can be detected.

In addition, the camera 100 has the out-of-finder display unit 107, an out-of-finder display drive-circuit 223, a power-supply control unit 224, a power supply unit 225, a recording medium I/F 226, an operation unit 228 and the like.

The out-of-finder display unit 107 is driven by the out-of-finder display drive-circuit 223 and displays various set values of the camera 100 such as a shutter speed, a diaphragm and the like.

The power-supply control unit 224 is constituted by a battery detection circuit, a DC-DC converter, a switch circuit which switches blocks to be electrically conducted and the like and detects presence/absence of attachment of a battery, a type of a battery, a residual amount of a battery and the like. In addition, the power-supply control unit 224 controls the DC-DC converter on the basis of the detection result and an instruction of the system control unit 50 and supplies a required voltage to each part including the recording medium 227 for a required period.

The power supply unit 225 is a primary battery such as an alkali battery and a lithium battery, a secondary battery such as a NiCd battery, a NiMH battery and an Li battery, an AC adapter and the like. The recording medium I/F 226 is an interface with the recording medium 227 such as a memory card, a hard disk and the like. The recording medium 227 is a memory card for recording a photographed image and the like and is constituted by a semiconductor memory, a magnetic disk and the like. The recording medium 227 may be detachably attached to the camera 100 or may be incorporated in the camera 100.

The operation unit 228 is an input unit which receives an operation from the user (user operation) and is used for inputting various instructions to the system control unit 50. The operation unit 228 includes the shutter button 101, the power switch 102, the mode-switching switch 103, the touch panel 109, and another operation unit 229. The other operation unit 229 includes the main electronic-dial 104, the sub electronic-dial 105, the video button 106, the direction key 110, the SET button 111, the AE-lock button 112, the enlargement button 113, the replay button 114, the menu button 115, the touch bar 119 and the like.

The shutter button 101 has a first shutter switch 230 and a second shutter switch 231. The first shutter switch 230 outputs a first shutter-switch signal SW1, when it is turned on in the middle of an operation of the shutter button 101, which is so-called half-pressing (photographing-preparation instruction). The system control unit 50 starts photographing preparation processing such as AF processing, AE processing, AWB processing, EF processing and the like in accordance with the first shutter-switch signal SW1. The second shutter switch 231 outputs a second shutter-switch signal SW2, when it is turned on with the operation of the shutter button 101 completed, which is so-called full-pressing (photographing instruction). The system control unit 50 starts a series of the photographing processing (processing from signal reading-out from the imaging unit 211 to generation of an image file including the photographed image and writing in the recording medium 227) in accordance with the second shutter-switch signal SW2.

The mode-switching switch 103 switches the operation mode of the system control unit 50 to any one of a still-image photographing mode, a video photographing mode, a replay mode and the like. Modes included in the still-image photographing mode are an auto-photographing mode, an auto scene-discrimination mode, a manual mode, a diaphragm-priority mode (Av mode), a shutter-speed priority mode (Tv mode), and a program AE mode (P mode). In addition, modes included in the still-image photographing mode are various scene modes which become photographing settings for each photographing scene, a custom mode and the like. The user can directly switch to any one of the aforementioned photographing modes by the mode-switching switch 103. Alternatively, the user can selectively switch to any one of the plurality of displayed modes by using the operation unit 228, after switching to a list screen of the photographing modes once by the mode-switching switch 103. Similarly, a plurality of modes may be included also in the video photographing mode.

The touch panel 109 is a touch sensor which detects various touch operations to a display surface of the display unit 108 (operation surface of the touch panel 109). The touch panel 109 and the display unit 108 can be integrally constituted. For example, the touch panel 109 is mounted on an upper layer of the display surface of the display unit 108 so that light transmittance does not hinder display of the display unit 108. And by associating an input coordinate in the touch panel 109 with a display coordinate on the display surface of the display unit 108, a GUI (Graphical User Interface) can be constituted as if the user can directly operate the screen displayed on the display unit 108. For the touch panel 109, any one method of various methods such as a resistive-film method, an electrostatic capacity method, a surface acoustic-wave method, an infrared ray method, an electromagnetic induction method, an image recognition method, an optical sensor method and the like can be used. Depending on the method, there are such a method that a contact with the touch panel 109 is detected as a touch and a method that approach of a finger or a pen to the touch panel 109 is detected as the touch, but any method may be used.

The system control unit 50 can detect the following operations or states to the touch panel 109:

That the finger or a pen which had not touched the touch panel 109 newly touched the touch panel 109, that is, start of the touch (hereinafter, referred to as touch down (Touch-Down)).

A state where the touch panel 109 is touched by the finger or a pen (hereinafter, referred to as touch-on (Touch-On)).

Movement on the touch panel 109 still touched by the finger or a pen (hereinafter, referred to as touch-move (Touch-Move)).

Separation (release) of the finger or a pen which had touched the touch panel 109 from the touch panel 109, that is, end of the touch (hereinafter, referred to as touch-up (Touch-Up)).

A state where the touch panel 109 is not touched at all (hereinafter, referred to as touch-off (Touch-Off)).

When the Touch-Down is detected, the Touch-On is also detected at the same time. After the Touch-Down, the Touch-On is continuously detected usually, unless the Touch-Up is detected. When the Touch-Move is detected, too, the Touch-On is continuously detected. Even when the Touch-On is detected, the Touch-Move is not detected, if the touch position has not been moved. After the detection that all the fingers and pens having touched are Touched-Up, it is brought into the Touch-Off.

These operations/states and the positional coordinates where the finger or a pen touches the touch panel 109 are notified to the system control unit 50 via an internal bus. The system control unit 50 determines what operation (touch operation) has been performed on the touch panel 109 on the basis of the notified information. Regarding the Touch-Move, a moving direction of the finger or a pen moving on the touch panel 109 can be determined for a perpendicular component/horizontal component on the touch panel 109 on the basis of a change in the positional coordinates. When the Touch-Move for a predetermined distance or more is detected, it is determined that a slide operation was performed. Such an operation that the finger is quickly moved only for some distance, while touching the touch panel 109 and removing it is called a "flick". The flick is, in other words, an operation of quickly tracing on the touch panel 109 as if flipping with the finger. When the Touch-Move for a predetermined distance or more at a predetermined speed or more is detected, and the Touch-Up is detected after that, it is determined that the flick was performed (it can be determined that the flick was performed subsequently to the slide operation). Furthermore, such a touch operation of touching a plurality of spots (two points, for example) together (multi-touch) so as to bring mutual touch positions close to each other is called "pinch-in" and such a touch operation of separating the touch positions from each other as "pinch-out". The pinch-out and the pinch-in are collectively called a pinch operation (or simply as a pinch).

Figure 3:
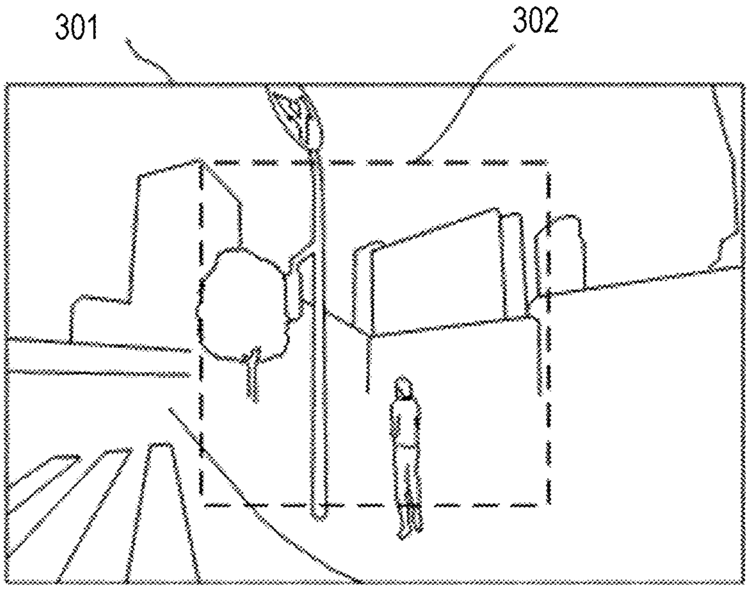
FIG. 3 is a diagram illustrating an AF available range according to the Embodiment 1.

FIG. 3 is a diagram illustrating the AF available range in the live-view image. As a matter of convenience of optical designs of the camera 100 and the lens unit 200, accuracy of the auto-focus (AF) might be limited to a range at predetermined accuracy or more in some cases. Thus, a range (area) that can be specified as a position where the AF is to be performed might be limited to a specific area in some cases as an area 302 in a live-view image 301. This specific area is called an "AF available range". The area 302, which is the AF available range, is determined on the basis of at least either one of camera information (information related to the camera 100) acquired from the camera 100 and lens information (information related to the lens unit 200) acquired from the lens unit 200. Note that, in FIG. 3, the AF available range is expressed as a rectangular area but may be an area of other (trapezoid, elliptical or polygonal) shapes.

Figure 4:
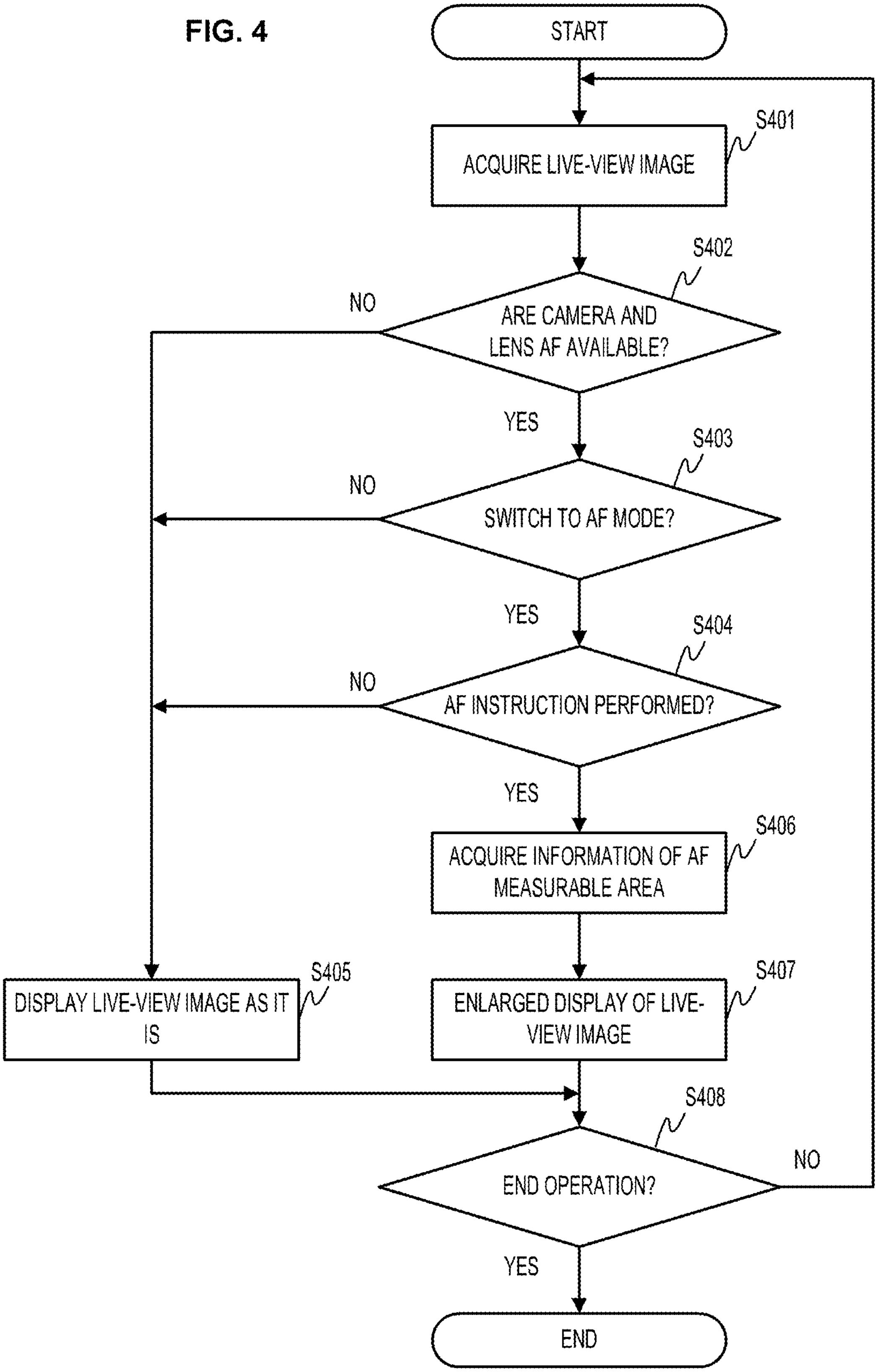
FIG. 4 is a flowchart of photographing-mode processing according to the Embodiment 1.

With reference to a flowchart in FIG. 4, the photographing-mode processing executed by the camera 100 according to Embodiment 1 will be explained. When the system control unit 50 expands the program stored in the non-volatile memory 219 to the system memory 218 and executes it, each processing in this flowchart is realized. When the power switch 102 is operated, and the power supply is switched to on, the system control unit 50 initializes a flag, a control variable and the like and then, starts the photographing mode processing.

At Step S401, the system control unit 50 acquires a live-view image from the imaging unit 211. For example, the system control unit 50 controls the imaging unit 211 so that an image of a real space is picked up and acquires the live-view image.

At Step S402, the system control unit 50 determines whether or not the camera 100 and the lens unit 200 are AF available. When the camera 100 and the lens unit 200 are determined to be AF available, the processing proceeds to Step S403. When it is determined that at least either one of the camera 100 and the lens unit 200 is not AF available, the processing proceeds to Step S405.

At Step S403, the system control unit 50 determines whether or not such an operation to switch the camera 100 to the AF mode (operation mode for performing auto-focus) has been performed to the operation unit 228. When it is determined that the operation to switch to the AF mode has been performed (when the camera 100 was switched to the AF mode), the processing proceeds to Step S404. When it is determined that the operation to switch to the AF mode has not been performed, the processing proceeds to Step S405.

At Step S404, the system control unit 50 determines whether or not an AF instruction of specifying the position of the AF has been made to the operation unit 228. The "AF instruction" can be a drag operation to the touch panel 109, a half-pressing operation to the shutter button 101 or an operation to an analog stick included in the other operation unit 229. In addition, when the eyepiece-detection unit 118 has a function of visual-line input, an operation by the visual-line input may be the AF instruction. When it is determined that the AF instruction has been made, the processing proceeds to Step S406. When it is determined that the AF instruction has not been made, the processing proceeds to Step S405.

At Step S405, the system control unit 50 displays the live-view image acquired at Step S401 on the display unit 108 or the EVF 217 as it is. That is, the system control unit 50 controls the display unit 108 or the EVF 217 so that the entire live-view image is displayed.

At Step S406, the system control unit 50 acquires information on the AF available range, which is information (information on a position, a shape and the like) for specifying the AF available range from the camera 100 and the lens unit 200. The system control unit 50 determines the AF available range in the live-view image on the basis of the information on the AF available range. The information on the AF available range is held in the recording medium 227 or the system memory 218 or the like.

Figure 5A:
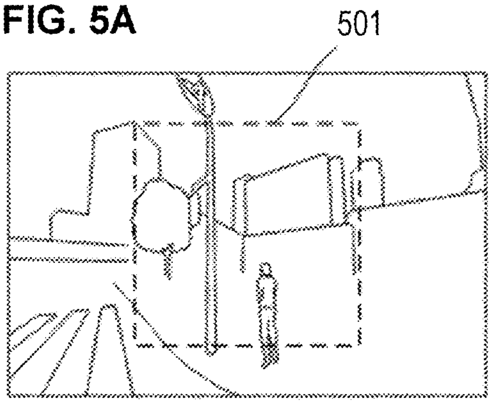
FIGS. 5A to 5E are diagrams for explaining enlarged display according to the Embodiment 1.

FIG. 5A illustrates display (live-view display) of the live-view image. An AF available range 501 is an area of a part of the live-view image. Note that, in actuality, a broken line indicating the AF available range 501 is not displayed on the display unit 108 or the EVF 217.

At Step S407, the system control unit 50 enlarges the live-view image acquired at Step S401 in accordance with the AF available range determined on the basis of the information acquired at Step S406. The system control unit 50 displays the enlarged live-view image on the display unit 108 or the EVF 217. Regarding the enlargement of the live-view image, detailed explanation will be made by using FIGS. 5B and 5C.

Figure 5B:
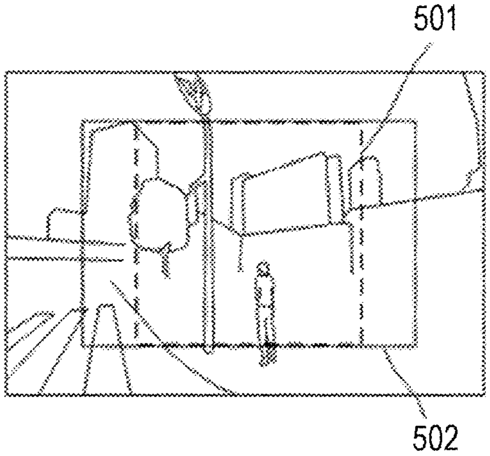

FIG. 5B illustrates a display range 502 in the live-view image when the AF available range 501 is displayed so as to be inscribed in (contact from an inner side) a display surface of the display unit 108 or the EVF 217. The system control unit 50 determines the display range 502 displayed on the display surface, when the AF available range 501 is inscribed in the display surface. The display range 502 is a rectangular area with the same aspect ratio as the aspect ratio of the display screen (monitor) of the display unit 108 or the EVF 217.

Figure 5C:
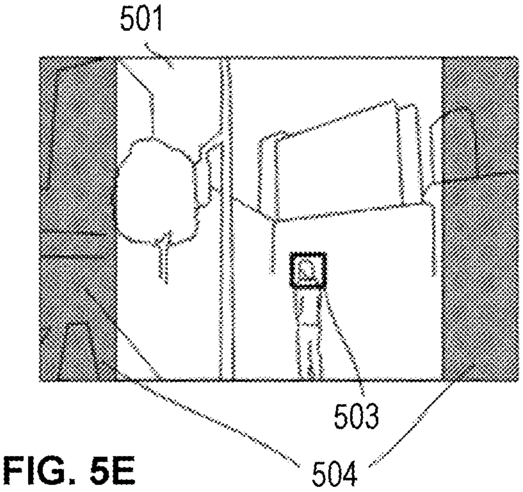

The system control unit 50 enlarges the display range 502 and displays the enlarged display range 502 on the display unit 108 or the EVF 217 as shown in FIG. 5C. As a result, the AF available range 501 is displayed in an enlarged state so as to be inscribed in the display surface of the display unit 108 or the EVF 217.

In addition, by means of the AF instruction at Step S404, the position of an AF frame 503, which is a display item indicating the position of the AF, is freely resettable in the AF available range 501. Here, when the AF available range 501 is displayed in an enlarged manner, an area 504 outside the AF available range 501 might be also displayed in some cases. In such a case, the system control unit 50 causes the area 504 outside the AF available range 501 shaded, for example, so that the user can grasp (distinguish between) an area inside and an area outside the AF available range 501. Methods other than the shaded display such as surrounding the AF available range 501 with a frame may be used as long as it enables the user to grasp the area inside and the area outside the AF available range 501.

Note that the AF available range 501 may be displayed so as to be circumscribed to (contact from an outer side) the display surface of the display unit 108 or the EVF 217.

Figure 5D:
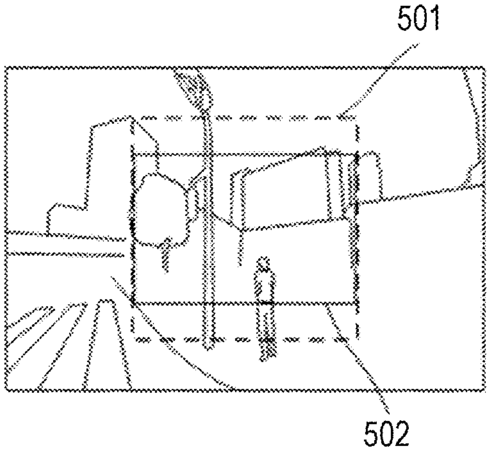

FIG. 5D illustrates an example of the display range 502 of the live-view image when the AF available range 501 is displayed to be circumscribed to the display surface of the display unit 108 or the EVF 217. The system control unit 50 determines the display range 502 to be displayed on the display surface when the AF available range 501 is circumscribed to the display surface. The display range 502 is a rectangular area with the same aspect ratio as the aspect ratio of the display surface (monitor) of the display unit 108 or the EVF 217.

Figure 5E:
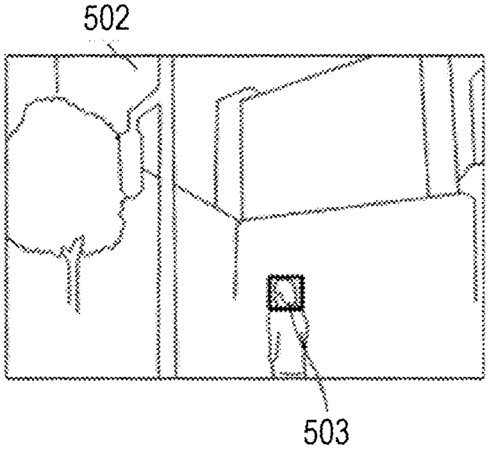

The system control unit 50 enlarges the display range 502 and displays the enlarged display range 502 on the display surface of the display unit 108 or the EVF 217, as shown in FIG. 5E. As a result, the AF available range 501 is enlarged and displayed so as to be circumscribed to the display surface of the display unit 108 or the EVF 217.

At Step S408, the system control unit 50 determines whether or not the end operation (a transfer instruction of the replay mode, a power-off operation or the like) has been performed to the operation unit 228. When it is determined that the end operation was performed, the photographing processing is finished, and the processing of this flowchart is finished. When it is determined that the end operation has not been performed, the processing proceeds to Step S401.

Note that the camera 100 has been explained as an electronic device according to the Embodiment 1, but the electronic device according to the Embodiment 1 may be a personal computer (PC) or a smartphone linked with the camera 100 (or controlling the camera 100). In such a case, at Step S401, the electronic device such as a PC or a smartphone acquires live-view images from the camera 100. In addition, at Step S404, the electronic device may control the position of the AF in the camera 100 on the basis of an operation from an application installed in the electronic device.

In addition, when another display device is connected to the camera 100 as an external output destination other than the display unit 108 and the EVF 217 mounted on the camera 100, in another display device, live-view display of a format different from those of the display unit 108 and the EVF 217 may be performed. For example, the display unit 108 and the EVF 217 display the live-view image with the AF available range enlarged. Another display device displays the live-view image before the enlargement.

In addition, on/off setting of the enlarged display and on/off setting of the automatic-switching display may be optionally made by the user through an operation to the operation unit 228.

Moreover, the system control unit 50 may switch between display of the entire live-view image and the display of partial enlargement of the live-view image in accordance with a specification of the display unit (the display unit 108 and the EVF 217) which displays the live-view image. For example, when a screen resolution (total pixels) of the display unit (the display unit 108 and the EVF 217) that displays the live-view image is larger than a predetermined number, the system control unit 50 may display the entire live-view image on the display unit. When a physical size of the display unit (the display unit 108 and the EVF 217) that displays the live-view image is larger than a predetermined size, the system control unit 50 may display the entire live-view image on the display unit. In addition, when the live-view image is to be displayed on the display unit 108, the system control unit 50 may display the entire live-view image, while when the live-view image is displayed on the EVF 217, the system control unit 50 may display the live-view image in the enlarged manner on the basis of the AF available range. Note that the system control unit 50 may display the live-view image so that the user can distinguish the AF available range from the range other than that, even when the entire live-view image is displayed. In addition, the display unit that displays the live-view image may be another display device connected as an external output destination other than the display unit 108 and the EVF 217.

As described above, according to the Embodiment 1, in the imaging device to which the single lens can be attached, the AF position in the AF available range can be specified easily by the enlarged display of the AF available range.

Embodiment 2

In the Embodiment 2, the enlarged display of the AF available range in an imaging device to which a twin lens can be attached will be explained. Note that, in the following, explanation on the same points as those in the Embodiment 1 (the same configuration and processing as those in the Embodiment 1, for example) will be omitted as appropriate.

Figure 6:
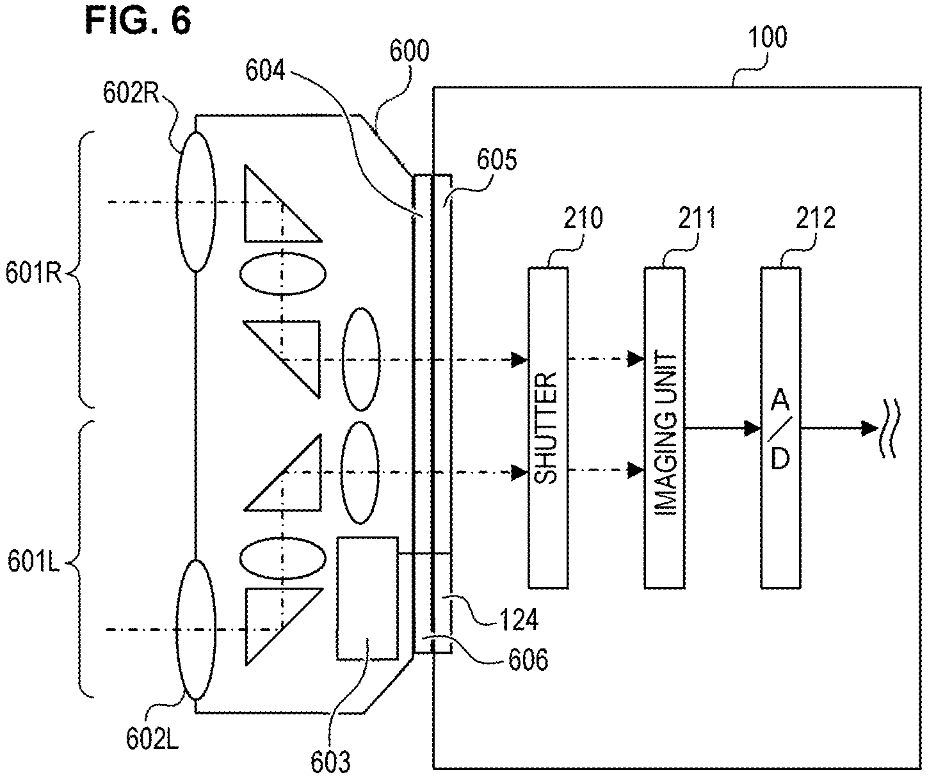
FIG. 6 is a diagram illustrating a twin-lens unit according to an Embodiment 2.

FIG. 6 is a schematic diagram illustrating an example of a configuration of a twin-lens unit 600 according to the Embodiment 2. In FIG. 6, the camera 100 to which the twin-lens unit 600 is attached is illustrated. Note that, in the camera 100 shown in FIG. 6, the same constituent elements as the constituent elements explained in FIG. 2 are given the same signs as those in FIG. 2, and the explanation on those constituent elements will be omitted as appropriate.

The twin-lens unit 600 is a kind of a replacement lens that can be detachably attached to the camera 100. The twin-lens unit 600 is a twin lens capable of imaging a right image and a left image with parallax. In this Embodiment, the twin-lens unit 600 has two optical systems, and a range of a wide viewing angle of approximately 180 degrees can be imaged with each of the two optical systems. Specifically, by means of each of the two optical systems of the twin-lens unit 600, a subject can be imaged for a field of view (angle of view) of 180 degrees in the right-left direction (horizontal angle, azimuth angle, yaw angle) and of 180 degrees in the up-down direction (vertical angle, elevation angle, pitch angle). That is, the range of the front hemisphere can be imaged by each of the two optical systems.

The twin-lens unit 600 has a right-eye optical system 601R having a plurality of lenses, a reflective mirror and the like, a left-eye optical system 601L having a plurality of lenses, a reflective mirror and the like, and a lens-system control circuit 603. The right-eye optical system 601R is an example of a first optical system, and the left-eye optical system 601L is an example of a second optical system. The right-eye optical system 601R has a lens 602R disposed on a subject side, and the left-eye optical system 601L has a lens 602L disposed on the subject side. The lens 602R and the lens 602L are directed to the same direction, and their optical axes are substantially parallel.

The twin-lens unit 600 is a twin lens (VR180 lens) for acquiring an image of VR180, which is one of formats of a VR (Virtual Reality) image, capable of twin-lens stereoscopic vision. In this Embodiment, the twin-lens unit 600 has a fisheye lens capable of catching a range of substantially 180 degrees for each of the right-eye optical system 601R and the left-eye optical system 601L. Note that, a range capable of catching by the lens provided in each of the right-eye optical system 601R and the left-eye optical system 601L may be approximately 160 degrees, which is smaller than the range of 180 degrees. The twin-lens unit 600 can form an image of a right image (first image) formed via the right-eye optical system 601R and a left image (second image) formed via the left-eye optical system 601L on one or two imaging elements of the camera to which the twin-lens unit 600 is attached.

The twin-lens unit 600 is attached to the camera 100 via a lens mount unit 604 and a camera mount unit 605 of the camera 100. In this way, via the communication terminal 124 of the camera 100 and a communication terminal 606 of the twin-lens unit 600, the system control unit 50 of the camera 100 and the lens-system control circuit 603 of the twin-lens unit 600 are electrically connected.

In this Embodiment, the right image formed via the right-eye optical system 601R and the left image formed via the left-eye optical system 601L are formed at the same time (in a set) on the imaging unit 211 of the camera 100. That is, the two optical images formed by the right-eye optical system 601R and the left-eye optical system 601L are formed on one imaging element. The imaging unit 211 converts the formed subject image (optical signal) to an analog electric signal. By using the twin-lens unit 600 as above, from two spots (optical systems) of the right-eye optical system 601R and the left-eye optical system 601L, two images with parallax can be acquired at the same time (in a set). By means of the VR display by dividing the acquired image to the image for the left eye and the image for the right eye, the user can view a stereoscopic VR image within a range of approximately 180 degrees. That is, the user can stereoscopically view the image of the VR180.

Here, the VR image is an image that can be VR-displayed, which will be described later. The VR images include a 360-degree image (omnidirectional image) picked up by a 360-degree camera (omnidirectional camera), a panoramic image having a video range (effective video range) wider than a display range displayed at a time on the display unit and the like. In addition, the VR image is not limited to a still image but includes a video and a live image (image acquired substantially on a real-time basis from the camera). The VR image has a video range (effective video range) for a field of view of 360 degrees in the right-left direction and 360 degrees in the up-down direction at the maximum. In addition, the VR images also include such an image having a view angle wider than the view angle that can be picked up by a usual camera or a video range wider than the display range that can be displayed at a time on the display unit even in the case less than 360 degrees in the right-left direction and less than 360 degrees in the up-down direction. An image picked up by the camera 100 by using the aforementioned twin-lens unit 600 is a type of the VR image. The VR image can be VR-displayed by setting a display mode of the display device (display device capable of displaying the VR image) to a "VR view", for example. By VR-displaying the VR image having the view angle of 360 degrees, and when the user changes the attitude of the display device to the right-left direction (horizontal rotating direction), the omnidirectional video without a joint in the right-left direction can be appreciated.

The VR display (VR view) is a display method (display mode) that displays a video of a viewing-field range according to the attitude of the display device in the VR images and can change the display range. The VR display has a "single-lens VR display (single-lens VR view)" that displays one image by performing deformation (distortion correction) of mapping the VR image on a virtual spherical body. In addition, the VR display has a "twin-lens VR display (twin-lens VR view)" that performs distortion of mapping the VR image for the left eye and the VR image for the right eye on the virtual spherical body, respectively, and displays them side by side in the right and left areas. It is possible to stereoscopically view those VR images by performing the "twin-lens VR display" by using the VR image for the left eye and the VR image for the right eye with parallax to each other. In any VR display, when the user wears a display device such as an HMD (head-mount display) or the like, for example, a video in the viewing-field range according to the direction of the face of the user is displayed. For example, in the VR images, it is assumed that a video in a viewing-field range around 0 degrees (specific azimuth or north, for example) in the right-left direction and 90 degrees (90 degrees from the zenith, that is, horizontal) in the up-down direction at a certain point of time is displayed. When the front and rear of the attitude of the display device is reversed from this state (the display surface is changed from southward to the northward, for example), in the same VR image, the display range is changed to the video of the viewing-field range around 180 degrees in the right-left direction (opposite azimuth or south, for example) and 90 degrees in the up-down direction. That is, when the user directs the face from the north to the south (that is, looking back) while wearing the HMD, the video displayed on the HMD is also changed from the video of the north to the video of the south. Note that the VR image picked up by using the twin-lens unit 600 of this Embodiment is a video (180° image) picking up an image in a range of approximately 180 degrees on the front, and there is no video in a range of approximately 180 degrees in the rear. When the image as above is VR-displayed, and the attitude of the display device is changed to the side where there is no video, a blank area is displayed.

By VR-displaying the VR image as above, the user can acquire such a sense (sense of immersion) as if the user is visually in the VR image (in the VR space). Note that the display method of the VR image is not limited to the method of changing the attitude of the display device. For example, the display range may be moved (scrolled) in accordance with the user operation via the touch panel, the direction button and the like. Moreover, at the time of the VR display (at the time of the display mode "VR view"), in addition to the change of the display range by the attitude change, the display range may be changed in accordance with the touch-move on the touch panel, the drag operation by a mouse and the like, pressing-down of the direction button and the like. Note that the smartphone attached to the VR goggles (head-mount adapter) is a kind of the HMD.

With reference to the flowchart in FIG. 7, a photographing-mode processing executed by the camera 100 according to the Embodiment 2 will be explained. To each step of the flowchart of the photographing-mode processing of the camera 100 according to the Embodiment 1, Step S701 and Step S702 are added.

Note that, at Step S406, the system control unit 50 acquires information on the AF available range from the camera 100 and the lens unit (lens unit 200 or the twin-lens unit 600).

Figure 8A:
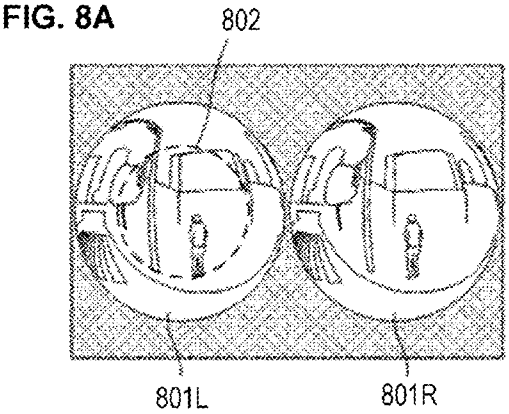
FIGS. 8A to 8E are diagrams illustrating an AF available range according to the Embodiment 2.

FIG. 8A illustrates a live-view image before the enlarged display acquired at Step S401. The live-view image includes a right image 801R formed via the right-eye optical system of a twin lens and a left image 801L formed via the left-eye optical system of the twin lens. An AF available range 802 is an area of a part of either one of the left image 801L and the right image 801R, for example. Actually, a broken line indicating the AF available range 802 is displayed in neither of the display unit 108 nor the EVF 217. Information on the position, the shape and the like of the AF available range 802 is held as the information of the AF available range 802 inside the camera 100.

At Step S701, the system control unit 50 determines whether or not the lens attached to the camera 100 is the twin-lens unit 600 (=whether the live-view image has the right image and the left image having parallax to each other). When it is determined that the lens attached to the camera 100 is the twin-lens unit 600, the processing proceeds to Step S702. When it is determined that the lens attached to the camera 100 is not the twin-lens unit 600, the processing proceeds to Step S407.

Figure 8B:
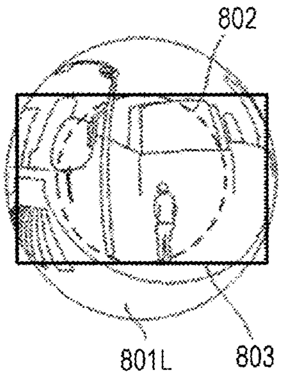

At Step S702, the system control unit 50 cuts out the image picked up by using the lens which performs the AF drive in the two images (left image and right image) picked up by using the twin-lens unit. In FIG. 8B, it is assumed that the twin-lens unit 600 performs the AF drive with the left lens, and the left image 801L in the live-view image is cut out.

At Step S407, the system control unit 50 enlarges the live-view image and displays it on the display unit 108 or the EVF 217 on the basis of the AF available range acquired at Step S406. By using FIGS. 8B and 8C, a display example of the enlarged live-view image when the lens attached to the camera 100 is the twin-lens unit 600 will be explained.

FIG. 8B is a diagram for explaining an example in which, when the lens connected to the camera 100 is the twin-lens unit 600, the AF available range 802 is enlarged so as to be inscribed in the display surface of the display unit 108 or the EVF 217. By using the image (either one of the left image and the right image) cut out of the live-view image at Step S702, a display range 803 in which the AF available range 802 is inscribed is determined. This display range 803 is a rectangular area with the same aspect ratio as the aspect ratio of the display screen (monitor) of the display unit 108 or the EVF 217.

Figure 8C:
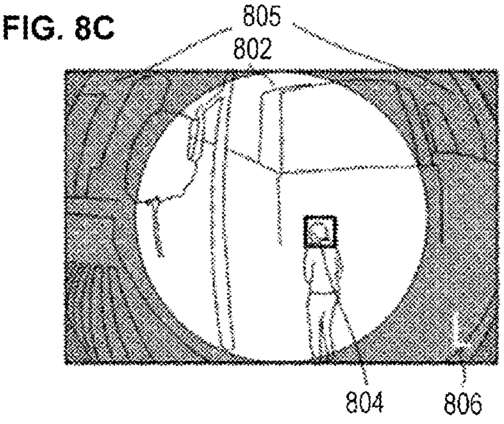

As shown in FIG. 8C, the system control unit 50 enlarges the display range 803 and displays the enlarged display range 803 on the display surface of the display unit 108 or the EVF 217. As a result, the AF available range 802 can be displayed in such a form that it is inscribed in the display unit 108 or the EVF 217.

In addition, as shown in FIG. 8C, the system control unit 50 acquires information on the lens to which the AF drive is to be performed in the twin lens (right and left lenses), and an icon 806 indicating the image currently displayed in the left image and the right image is superposed and displayed. An AF frame 804, an area 805 outside the AF available range are displayed similarly to the AF frame 503, the area 504 outside the AF available range in the Embodiment 1.

Note that specific processing or operation may be associated with (allocated to) the area 805 outside the AF available range. For example, when the area 805 in the touch panel 109 is touched, the image to be displayed may be switched from one of images to the other image in the left image and the right image. In addition, when the area 805 is selected by the user by an operation to the operation unit 228 other than the touch panel 109, too, the switching of displayed image may be possible. Furthermore, it may be possible to switch to a display format in which one image of the left image and the right image is displayed as it is, a display format for displaying the entire circumferential fish eye on one side, a display format for displaying an image to which equidistant cylindrical conversion was executed and the like by an operation to the operation unit 228. As described above, when a position in the AF available range 802 is selected (operated), the system control unit 50 may move the AF frame 804 to that position, and when the position in the area 805 is selected, the system control unit 50 may execute processing other than the movement of the position of the AF frame 804.

Figure 8D:
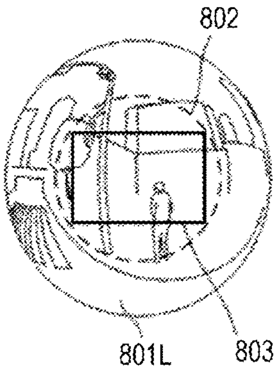
Figure 8E:
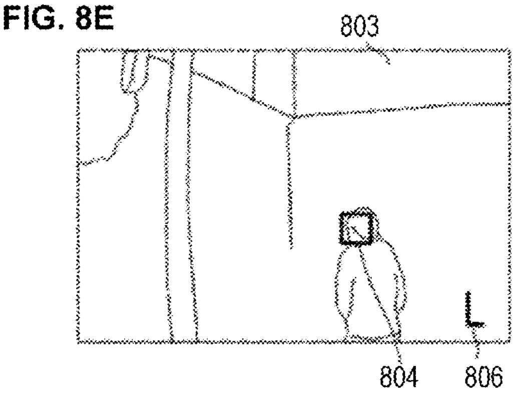

In addition, similarly to the Embodiment 1, the AF available range 802 may be displayed so as to be circumscribed to the display surface of the display unit 108 or the EVF 217. FIG. 8D illustrates an example of enlargement so that the AF available range 802 is circumscribed to the display surface of the display unit 108 or the EVF 217. The system control unit 50 determines the display range 803 of the live-view image so that the AF available range 802 is circumscribed to the display surface. The display range 803 is a rectangular area with the same aspect ratio as the aspect ratio of the display surface (monitor) of the display unit 108 or the EVF 217.

As shown in FIG. 5E, the system control unit 50 enlarges the display range 803 and displays the enlarged display range 803 on the display surface of the display unit 108 or the EVF 217. As a result, the AF available range 802 is displayed in the enlarged manner so as to be circumscribed to the display surface of the display unit 108 or the EVF 217. Note that, in the Embodiment 2, the shape of the AF available range was assumed to be circular but may be the other shapes.

Figure 7:
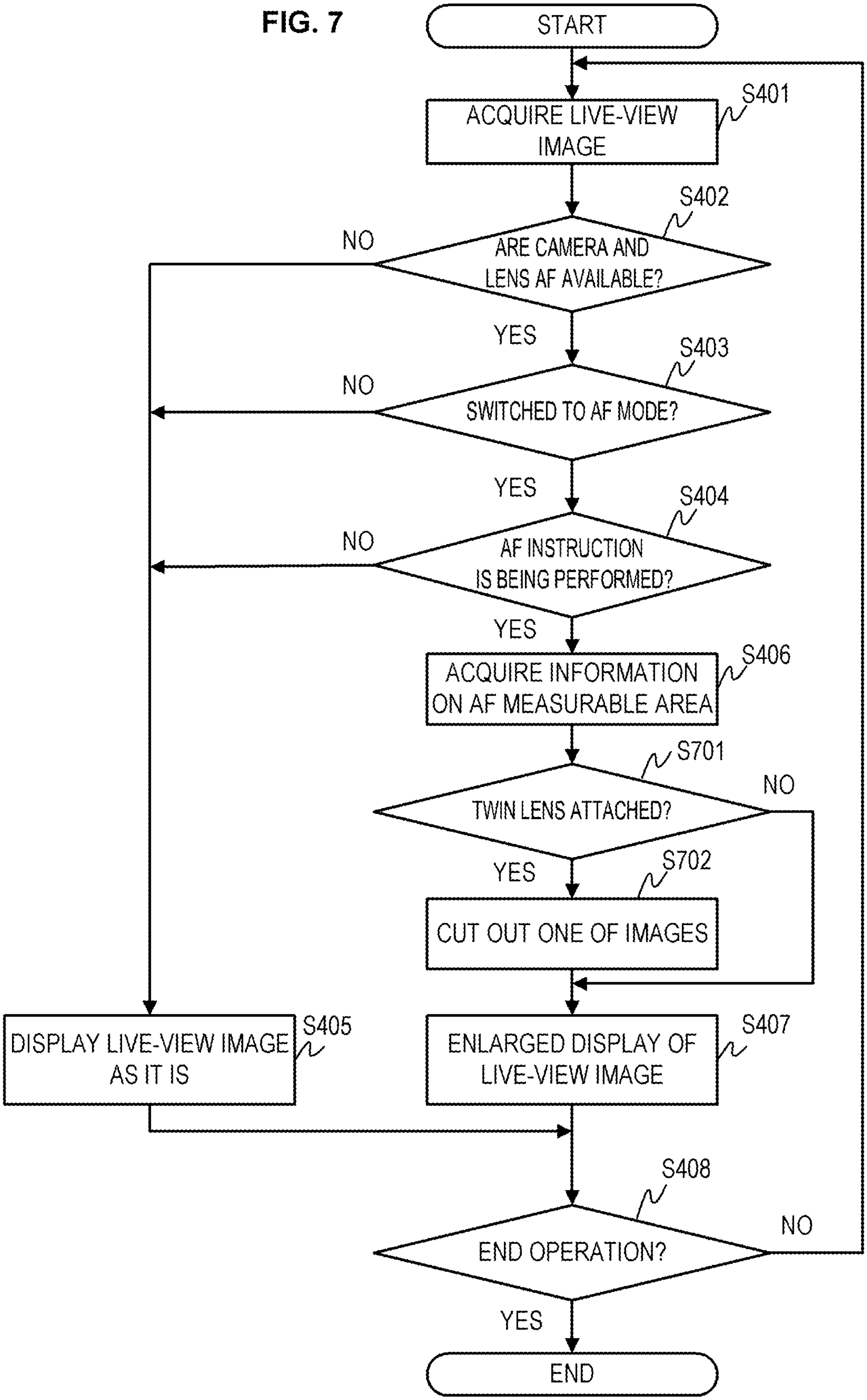
FIG. 7 is a flowchart of photographing-mode processing according to the Embodiment 2.

Since details of processing at the other steps (steps other than Step S701 and Step S702) in the flowchart in FIG. 7 are similar to those in the Embodiment 1, the explanation will be omitted.

According to the Embodiment 2, in the imaging device to which the twin lens can be attached, specification of the AF position in the AF available range is facilitated by the enlarged display of the AF available range.

Embodiment 3

In the Embodiment 1 and Embodiment 2, the example of the enlarged display of the AF available range at photographing in the AF mode was explained. In the Embodiment 3, an example of the enlarged display of the AF available range at photographing in a touch-and-shutter mode will be explained. Note that, for the same configurations and processing as those in the Embodiment 1 and the Embodiment 2, the explanation will be omitted. Note that, the touch-and-shutter mode is such an operation mode that focusing is performed (auto-focus) at the touched position, and photographing (release) is performed.

Figure 9:
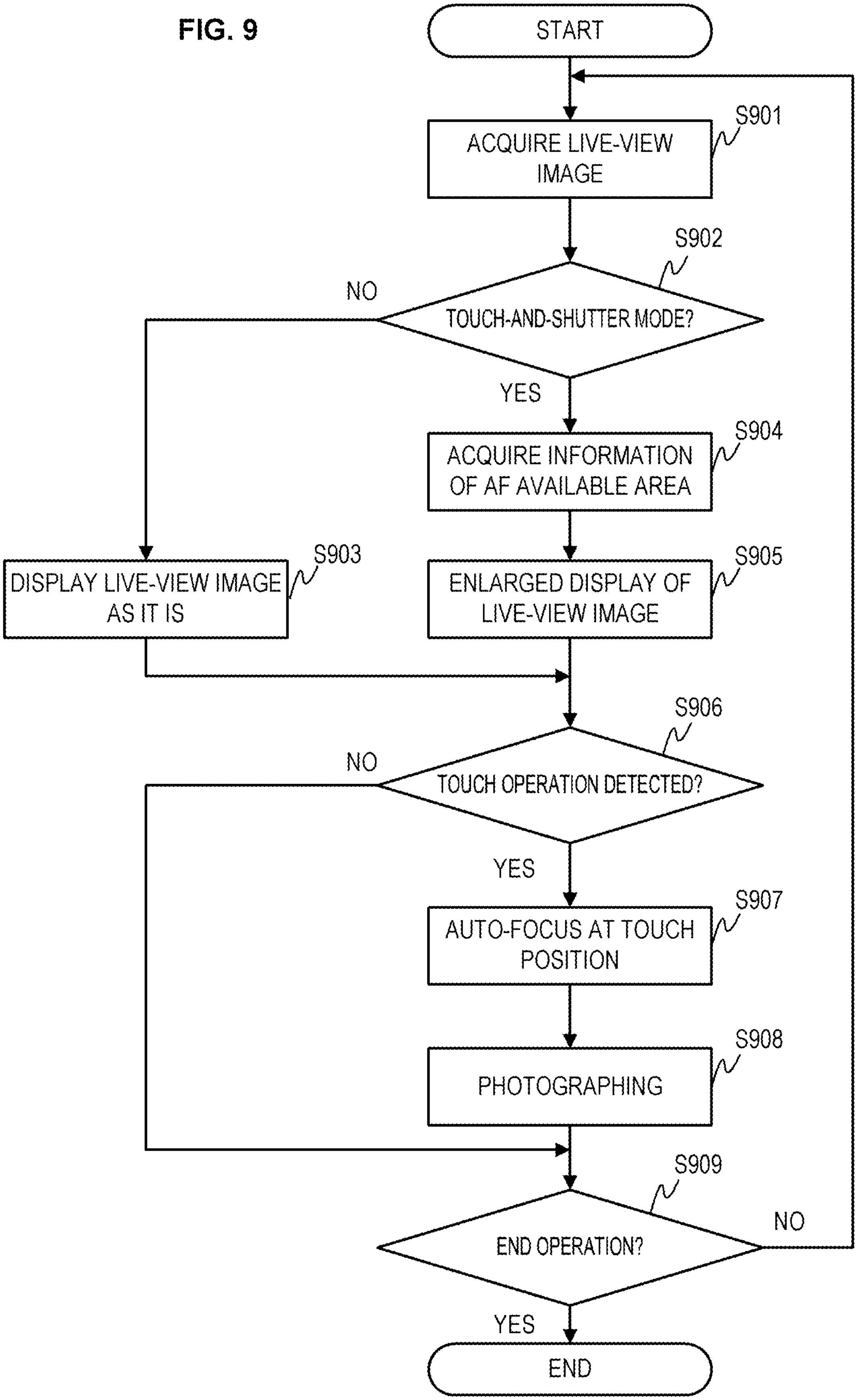
FIG. 9 is a flowchart of the photographing-mode processing according to an Embodiment 3.

With reference to the flowchart in FIG. 9, the processing in the photographing mode executed by the camera 100 according to the Embodiment 3 will be explained.

At Step S901, the system control unit 50 acquires the live-view image from the imaging unit 211.

At Step S902, the system control unit 50 determines whether or not the camera 100 is in the touch-and-shutter mode. When it is determined that the camera 100 is in the touch-and-shutter mode, the processing proceeds to Step S904. When it is determined that the camera 100 is not in the touch-and-shutter mode, the processing proceeds to Step S903.

At Step S903, the system control unit 50 displays the entire live-view image acquired at Step S901 as it is on the display unit 108 or the EVF 217.

At Step S904, the system control unit 50 acquires information of the AF available range from the camera 100 and the lens unit 200. The acquiring processing of the information of the AF available range at Step S904 is the same as the processing of acquiring according to the Embodiment 1 and the Embodiment 2 (processing at Step S406).

At Step S905, the system control unit 50 enlarges the live-view image on the AF available range and displays it on the display unit 108 or the EVF 217. The enlargement processing of the live-view image at Step S905 is the same processing as the enlargement processing of the live-view image according to the Embodiment 1 and the Embodiment 2 (processing at Step S407).

At Step S906, the system control unit 50 determines whether or not the touch operation has been detected (the user performed the touch operation). When it is determined that the touch operation was detected, the processing proceeds to Step S907. When it is determined that the touch operation has not been detected, the processing proceeds to Step S909.

At Step S907, the system control unit 50 executes focusing (auto-focus) at the position touched by the user.

At Step S908, the system control unit 50 performs photographing (release).

At Step S909, the system control unit 50 determines whether or not the operation of ending photographing has been performed. When it is determined that the operation of ending the photographing has been performed, the processing of this flowchart is finished. When it is determined that the operation of ending the photographing has not been performed, the processing proceeds to Step S901.

As described above, according to this flowchart, in the touch-shutter mode, the AF available range is enlarged, and the live-view display is performed.

Note that, when the AF available range is touched during the enlarged display of the AF available range, the AF available range may be further enlarged around the touched spot.

The user might want to temporarily change the enlarged display of the AF available range to the entire display in order to check the entire live-view image in some cases. Thus, the system control unit 50 may switch the enlarged display of the AF available range to the entire display (display of the entire live-view image) in any one of the following cases. In this case, after predetermined time (5 seconds or 10 seconds, for example) has elapsed after the switching to the entire display, the display may be switched again to the enlarged display:

When the camera 100 moves more largely than a threshold value;

When a subject (object) to be imaged by the camera 100 moves more largely than the threshold value;

When a spot outside the AF available range is touched (operated: selected) in the live-view image;

When the display unit for displaying the live-view image is switched;

When a distance between the camera 100 and the user's eye is separated more largely than a predetermined distance;

When brightness of the live-view image is changed more largely than a predetermined amount; and When a user operation has not been performed to the camera 100 for a period longer than the predetermined time.

For example, it is assumed such a case that the sensor for detecting movement of the camera 100 is mounted on the camera 100. In this case, the system control unit 50 acquires a movement amount of the camera 100 from the sensor and determines whether or not the acquired movement amount exceeds a first threshold value. The system control unit 50 determines that the camera 100 has moved more largely than the threshold value, when it is determined that the movement amount exceeds the first threshold value.

In addition, it is assumed that the camera 100 can recognize the subject, and the subject can be traced by image processing. In this case, the system control unit 50 calculates a movement amount of the subject between front and rear frames at the tracing. When the system control unit 50 determines that the movement amount of the subject exceeds a second threshold value, it is determined that the subject has moved more largely than the threshold value.

In the Embodiment 3, the camera 100 displays the AF available range in the enlarged manner at the timing of switching to the touch-and-shutter mode. As a result, a desired subject in the AF available range can be selected more easily in the touch-and-shutter mode, and it becomes easier to photograph by focusing to the selected subject.

Note that the aforementioned various controls explained as those executed by the system control unit 50 may be executed by one unit of hardware, or the entire device may be controlled by sharing the processing by a plurality of units of hardware (a plurality of processors and circuits, for example).

In addition, details have been described on the basis of the Embodiments of the present invention, but the present invention is not limited to these specific embodiments, and various forms within a range not departing from the gist of the present invention are also included in this invention. In addition, each of the aforementioned embodiments only illustrates one embodiment of the present invention and each of the embodiments can be also combined as appropriate.

In addition, in the aforementioned embodiments, the case in which the present invention is applied to the camera 100 was explained as an example, but this example is not limiting, and any device having the imaging function is applicable. That is, the present invention can be applied to electronic devices such as a mobile phone, a smartphone and the like having a camera function.

In addition, not limited to the imaging device main body, the present invention can be applied also to a control device that communicates with the imaging device (including a network camera) via wired or wireless communication and remotely controls the imaging device. As a device for remotely controlling the imaging device, there are devices such as a smartphone, a tablet PC, a desktop PC and the like, for example. On the basis of the operation performed on the control device side and the processing executed on the control device side, by notifying a command for causing the imaging device to perform various operations and settings from the control device side, the imaging device can be remotely controlled. In addition, it may be so configured that the live-view image photographed by the imaging device is received in a wired manner or via wireless communication so as to be displayed on the control device side.

According to the present invention, even if a range in which the position of the AF can be specified is limited, the user can determine the position of the AF more easily in the range.

In addition, in the above, "when A is equal to or larger than B, the processing proceeds to Step S1, while when A is smaller (lower) than B, the processing proceeds to Step S2" may read "when A is larger (higher) than B, the processing proceeds to Step S1, while when A is equal to or smaller than B, the processing proceeds to Step S2". To the contrary, "when A is larger (higher) than B, the processing proceeds to Step S1, while when A is equal to or smaller than B, the processing proceeds to Step S2" may read "when A is equal to or larger (higher) than B, the processing proceeds to Step S1, while when A is smaller (lower) than B, the processing proceeds to Step S2". Thus, unless contradiction occurs, "equal to or larger than A" may read "larger (higher; longer; more) than A", and "equal to or smaller than A" may read "smaller (lower; shorter; less) than A". And "larger (higher; longer; more) than A" may read "equal to or larger than A", and "smaller (lower; shorter; less) than A" may read "equal to or smaller than A".

Note that the above-described various types of control may be processing that is carried out by one piece of hardware (e.g., processor or circuit), or otherwise. Processing may be shared among a plurality of pieces of hardware (e.g., a plurality of processors, a plurality of circuits, or a combination of one or more processors and one or more circuits), thereby carrying out the control of the entire device.

Also, the above processor is a processor in the broad sense, and includes general-purpose processors and dedicated processors. Examples of general-purpose processors include a central processing unit (CPU), a micro processing unit (MPU), a digital signal processor (DSP), and so forth. Examples of dedicated processors include a graphics processing unit (GPU), an application-specific integrated circuit (ASIC), a programmable logic device (PLD), and so forth. Examples of PLDs include a field-programmable gate array (FPGA), a complex programmable logic device (CPLD), and so forth.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-208780, filed on Dec. 11, 2023, which is hereby incorporated by reference herein in its entirety.

What is claimed is:

1. An electronic device comprising:

a processor; and a memory storing a program which, in a case where being executed by the processor, causes the electronic device to execute image acquiring processing of acquiring a live-view image which picked up an image of a real space by an imaging device;

execute first determination processing of determining whether or not the live-view image has a first image and a second image having parallax to each other;

execute second determination processing of determining a first range indicating a range having accuracy of auto-focus equal to or higher than predetermined accuracy in the live-view image; and execute control processing of controlling a display such that a part of the live-view image is displayed on a basis of the first range, wherein in the second determination processing, in a case where it is determined that the live-view image has the first image and the second image, a range indicating a range where accuracy of auto-focus in the first image or the second image is equal to or higher than the predetermined accuracy is determined as the first range.

2. The electronic device according to claim 1, wherein in the control processing, the display is controlled such that the first range is displayed by contacting a display surface of the display from an inner side of the display.

3. The electronic device according to claim 2, wherein in the control processing, in a range of the live-view image displayed on the display, the first range and a second range, which is not the first range, are displayed such that it is possible for a user to distinguish between the first and second ranges.

4. The electronic device according to claim 3, wherein in a case where a position in the first range is selected by the user, first processing of moving a display item, which indicates a position of auto-focus, to the selected position is executed; and in a case where a position in the second range is selected by the user, second processing different from the first processing is executed.

5. The electronic device according to claim 1, wherein in the control processing, the display is controlled such that the first range is displayed in contact with a display surface of the display from an outer side of the display.

6. The electronic device according to claim 1, wherein in the control processing, in a case where the imaging device is not in a specific operation mode, the display is controlled such that an entirety of the live-view image is displayed.

7. The electronic device according to claim 6, wherein the specific operation mode is an operation mode for performing auto-focus.

8. The electronic device according to claim 6, wherein the specific operation mode is an operation mode for photographing after auto-focus is performed on a touched position.

9. The electronic device according to claim 1, wherein the first range is determined on a basis of at least either one of information related to the imaging device or information related to a lens attached to the imaging device.

10. The electronic device according to claim 1, further comprising:

the imaging device that acquires the live-view image by picking up an image of the real space.

11. An electronic device comprising:

a processor; and a memory storing a program which, in a case where being executed by the processor, causes the electronic device to execute image acquiring processing of acquiring a live-view image which picked up an image of a real space by an imaging device;

execute determination processing of determining a first range indicating a range having accuracy of auto-focus equal to or higher than predetermined accuracy in the live-view image; and execute control processing of controlling a display such that a part of the live-view image is displayed on a basis of the first range, wherein in the control processing, even in a case where a part of the live-view image is displayed on the display on the basis of the first range, in a specific case, display on the display is switched such that an entirety of the live-view image is displayed, and wherein the specific case is a case where it is determined that a movement amount of the imaging device is larger than a first threshold value, a case where it is determined that a movement amount of an object imaged by the imaging device is larger than a second threshold value, or a case where an operation has been performed on a second range, which is not the first range, in the live-view image.

12. A control method of an electronic device, the method comprising:

an image acquisition step of acquiring a live-view image which picked up an image of a real space by an imaging device;

first determination step of determining whether or not the live-view image has a first image and a second image having parallax to each other;

second determination step of determining a first range indicating a range having accuracy of auto-focus equal to or higher than predetermined accuracy in the live-view image; and a control step of controlling a display such that a part of the live-view image is displayed on a basis of the first range, wherein:

in the second determination step, in a case where it is determined that the live-view image has the first image and the second image, a range indicating a range where accuracy of auto-focus in the first image or the second image is equal to or higher than the predetermined accuracy is determined as the first range.

13. A non-transitory computer readable medium that stores a program, wherein the program causes a computer to execute a control method for an electronic device, the control method comprising:

an image acquisition step of acquiring a live-view image which picked up an image of a real space by an imaging device;

first determination step of determining whether or not the live-view image has a first image and a second image having parallax to each other;

second determination step of determining a first range indicating a range having accuracy of auto-focus equal to or higher than predetermined accuracy in the live-view image; and a control step of controlling a display such that a part of the live-view image is displayed on a basis of the first range, wherein:

in the second determination step, in a case where it is determined that the live-view image has the first image and the second image, a range indicating a range where accuracy of auto-focus in the first image or the second image is equal to or higher than the predetermined accuracy is determined as the first range.

* * * * *